(12) United States Patent
Ball et al.

(10) Patent No.: US 6,285,178 B1
(45) Date of Patent: Sep. 4, 2001

(54) POWER SUPPLY

(75) Inventors: David A. Ball, Westerville; William T. Hanna; Joseph A. Stets, both of Gahanna, all of OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 09/501,737

(22) Filed: Feb. 11, 2000

Related U.S. Application Data
(60) Provisional application No. 60/119,701, filed on Feb. 11, 1999.

(51) Int. Cl.[7] ............................... G05F 3/20; H02K 29/00
(52) U.S. Cl. .............................................. 323/351; 318/137
(58) Field of Search ................................ 323/351, 20, 21; 307/68, 64; 318/138

(56) References Cited

U.S. PATENT DOCUMENTS

| | | |
|---|---|---|
| 2,740,904 | 4/1956 | Goss . |
| 3,678,284 * | 7/1972 | Peters .................................. 290/1 R |
| 3,753,069 | 8/1973 | Newton . |
| 4,131,827 | 12/1978 | Larrabee . |
| 4,262,209 | 4/1981 | Berner . |
| 4,563,624 | 1/1986 | Yu . |
| 4,686,375 * | 8/1987 | Gottfried .................................. 290/2 |
| 4,715,192 * | 12/1987 | Katz .................................. 62/323.1 |
| 4,731,547 * | 3/1988 | Alenduff et al. ........................ 307/85 |
| 4,884,160 | 11/1989 | Pasquarella . |
| 5,021,679 | 6/1991 | Fairbanks et al. . |
| 5,493,155 | 2/1996 | Okamoto et al. . |
| 5,500,561 | 3/1996 | Wilhelm . |
| 5,536,976 * | 7/1996 | Churchill .................................. 307/11 |

OTHER PUBLICATIONS

Daughtery, H. "Automatic Transfer Switches" in: On–Site Power Generation (3rd ed., Boca Raton, Fl, Electrical Generating Systems Association, 1998), Ch. 7, pp. 143–147. No month available.

* cited by examiner

Primary Examiner—Peter S. Wong
Assistant Examiner—Rajnikant Patel
(74) Attorney, Agent, or Firm—Philip J. Pollick

(57) ABSTRACT

The present invention is a power supply (10) that starts a load (20) with a heavy start-up power draw from a power grid (12) and then switches the load to a generator (22) for lower power draw operation thereby avoiding the need for a large capacity generator capable of initial start-up of the load (20). The power supply comprises a conductor (15) for connecting to a power grid, an electrical power generation device (30), an electrical power using device or load (20) and a switching mechanism (40) for 1) isolating the power grid (12) from the power generation device (30), 2) connecting the power grid conductor (15) to the electrical power using device (20) for the initial start-up of the power using device (20), and 3) connecting the power generation device (30) to the power using device (20) after initial start-up. In addition the power supply (10) can also serve as a backup source of power for multiple circuits whose total startup load exceeds the total output of the generator (30) during periods of grid power failure by selectively turning off interruptible circuit load (20) during the startup of other circuits (16) or allowing intermittent circuit loads (20) to complete their cycle and return to an off state prior to the start-up of other circuits (16).

32 Claims, 12 Drawing Sheets

POWER SUPPLY

CROSS REFERENCE TO RELATED APPLICATION

This application claims the benefit of U.S. provisional application 60/119,701 filed on Feb. 11, 1999 all of which are incorporated by reference as if completely written herein.

BACKGROUND OF THE INVENTION

1. Field of the Invention

This invention pertains to an electric power supply system and more particularly to an electric power supply system that includes a power grid source and an electrical power generation source (generator) with a switching mechanism that 1) electrically isolates the grid from the power generation device, 2) starts a power using device (load) from the grid and 3) uses the power generation device for operating the load after initial startup from the grid. By using grid startup, the generator can be "undersized" to meet running rather than startup load capacity. In addition, the generator can also be used as a backup electrical supply when the power grid is down. In such instances, the "undersized" generator is fully utilized by using intelligent load control to schedule startup and operation of critical circuits.

2. Background of the Invention

Many changes are occurring in the electric power industry due to utility deregulation and opening of competitive markets. One such change is the increased importance of pricing electricity according to its value to the customer and its actual cost of delivery. The cost of delivering electricity is a strong function of demand and varies substantially during the course of the day and season.

At present, most residential and light commercial electric customers are charged a flat rate for electricity that is the same throughout the year or which may vary from season to season. Advanced technology for metering and data transmission is fostering electric meters that allow for real-time pricing of electricity to all customers including residential customers. Real time pricing allows electricity providers to vary the cost of power to the consumer at different times during the day and season depending on the cost of generation, transmission, and distribution capacity and other market conditions that prevail at the time. The result is lower power cost during off-peak periods and higher cost during on-peak periods. The demand for electric air conditioning usually occurs during on-peak periods in most utility areas. Therefore, the cost of power for air conditioning is expected to be substantially greater in the future than at present even though the total cost of power in aggregate may be lower.

Another effect of electric industry deregulation is possible lower reliability of grid power. This effect, even if it does not occur, will, at a minimum, cause anxiety among customers. When combined with already existing anxiety over power outages due to natural disasters, this is expected to cause increasing demand for standby or emergency on-site power generating capability.

However, the present approach to on-site power genration leaves much to be desired. Presently homeowners and small businesses purchase and install standby generators to provide power only during periods when power from the electric grid is not available. These devices typically work through an automatic transfer switch which activates the generator upon loss of grid power and transfers selected "critical loads" from the grid bus to the power feed from the generator. Critical loads typically include food storage (refrigerator and freezer), furnace, sump pump, well pump (for those having water wells), and at least one lighting circuit which in a growing number of cases can amount to a home office.

The starting of electric motors (all but for the lighting load listed above) has a significant impact on generator sizing. A typical motor often requires a starting current three or more times the current required for steady run. Thus, a motor normally requiring 1 kW to run (such as a furnace blower or refrigerator compressor) may require a generator having 3 to 5 kW of available capacity for starting. This becomes problematic for generators used in standby service because the generator must be sized for the worst case load. Such a scenario for a typical household having a standby generator is present below in Table 1.

TABLE 1

Worst Case Critical Load for Standby Generator Sizing

| Device | Starting Load | Running Load |
|---|---|---|
| Refrigerator | 2200 | 700 |
| Freezer | 2200 | 700 |
| Sump Pump | 2100 | 1000 |
| Well Pump | 2100 | 1000 |
| Lighting | 1000 | 1000 |
| Furnace | 2350 | 875 |
| TOTAL | 11950 | 5275 |

As is readily apparent, on-site power generation tends to be expensive because of the large generator capacity needed under start-up conditions. Further this capacity is little used since outages tend to be infrequent and of limited duration.

As such, it is an object of the present invention to provide a system that reduces the cost of power for large power load devices.

It is an object of the present invention to provide a system that reduces the cost of power for air conditioning systems.

It is an object of the present invention to provide a system that provides standby power for critical needs during power outages.

It is an object of the present invention to provide a system that utilizes a fossil fuel engine to generate electrical power.

It is an object of the present invention to provide an electrical power generating system with a driving engine having a long life.

It is an object of the present invention to provide an electrical power generating system with a driving engine having high efficiency.

It is an object of the present invention to provide a relatively small electrical power generating system that avoids large start-up electrical energy draws on the system.

It is an object of the present invention to provide an electrical power generator of a reduced size to match only the running load of electrically operated appliances.

It is an object of the present invention to provide a switch for providing start-up power to an electrically operated device from the power grid and then running the device from a power generator.

It is an object of the present invention to provide a power generating device that affords power shaving (energy cost reduction) for an electrically operated device during peak power grid periods and backup power for one or more critical power needs during grid power outage.

It is an object of the present invention to provide a power generating device and switch that allows startup of an electrical device from a power grid followed by running operation after startup of the electrical device from the power generating device and the use of the power generating device as a source of backup power for one or more critical power needs during grid power outage.

It is an object of the present invention to use optimally, an undersized power generating device by selectively and intelligently scheduling a critical load inventory.

SUMMARY OF THE INVENTION

The present invention is a power supply that enables switching a load between a power grid for heavy power draw startup and then to a generator for lower power draw operation after startup. The power supply comprises a conductor for connecting to a power grid, an electrical power generation device, an electrical power using device (load) and a switching mechanism for 1) isolating the power grid from the power generation device, 2) connecting the power grid conductor to the electrical power using device for the initial start-up of the power using device, and 3) connecting the power generation device to the power using device after initial, heavy power draw start-up.

The power supply can also be used to power critical circuits such as life support, refrigeration, and similar systems during power failure of the grid. The switching mechanism can operate these circuits in such a fashion that the total startup load exceeds the total output of the power supply. By shutting down interruptible loads such as freezers, refrigerators, and furnaces, startup loads of other circuits such as sump and well pumps can be met. By sequently scheduling intermittent devices such as well and sump pumps and allowing them to complete their cycle, generator power becomes available for startup of other load. Such intelligent scheduling by using a minicomputer switching device, allows the use of an "under-sized" generator for both large load energy shaving using lower cost fuels during peak grid demand and maximizing the number of circuits that can be operated during emergency use. Although the power supply system may use a wide variety of power generation devices, it is especially advantageous to use fossil fuels such as natural gas in a low-maintenance combustion engine.

Because the grid is relied on for startup of heavy load power using devices, significant costs savings are afforded as a result of having only to meet the operating load of such devices. Thus the power generating device need only be of sufficient output to meet the running requirements of the load rather than the heavy power draw start up conditions. In fact, it is not necessary that the generator even be capable of starting a device with a heavy startup draw.

One particularly well suited, heavy load device for use with the present switching device is an air conditioning unit. Such units have large start up draws and use large amounts of energy during peak peaks of electrical energy consumption. By starting an air conditioner from the grid and then using the switching device of the current invention to switch to a gas driven generator system, it is possible to take advantage of lower cost gas energy sources. In additional the use of the generator in this fashion enables a significant amount of use for a piece of equipment that in the past has been little used except in emergency situations that are typically of short duration.

In addition to the basic transfer function, the invention features a fuel enrichments and engine speed increase embodiments that have the advantage of providing a smooth transition from a no load to a fully loaded generator. This is especially important in view of the fact that a key advantage to the current invention is the use of an "undersized" power source.

When the grid loses power, the generator becomes a source of energy to maintain critical circuits such as refrigeration, health care, sump and water pumps, lighting and even the equipment found in a home office. By classifying this equipment with regard to start-up frequency or cycling, the duration of use, the possibility of postponing use, and so forth, it is possible to achieve much greater capacity that might be expected from a "maximum" power draw approach. Such intelligent load control allows a small generator to provide up to 40% greater service then might otherwise be expected without intelligent load control.

Another feature of the present invention is that the load can be allowed to operate for a short period of time on the generator when grid power fails. Typically in such a situation, a large load operating off the generator is terminated when the grid goes off. However, by allowing the load to continue to run for a short period of time, false starts and cycling can be avoided if the grid failure is merely of a fleeting nature. Such continued running allows stabilization and a more efficient allocation of energy resources.

Another feature of the current invention is the use of solid state devices such as microcomputers to control all operating functions that might otherwise to controlled by convention relays and contracts. This has the key advantage of making the entire system more reliable and reduces costs considerably by eliminating much of the previously required hardware including an automatic transfer switch that are otherwise required. In addition, a solid state device allows sampling of both the voltage on the grid and on the generator. Although indiscriminate transfer can result in occasional poor performance during transfer because of the application of out of phase power sources, it has been found that it is not necessary that the grid and the generator be locked into phase for effective transfer. Rather and since the generator voltage output various with the speed of the motor it periodically finds itself in phase with the constant phase relation found on the grid. By monitoring both the grid and generator, it is possible to take advantage of those times with the grid and generator become congruent and make the change over at such moments and also starting the transfer a few microseconds early to make the transfer at zero voltage.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWINGS

FIG. 4a shows further detail of switch S-1 of FIG. 3. FIG. 4b illustrates a 12 volt control circuit for use with the present invention. FIG. 4c shows control circuits that are powered by 110–120 volt ac power from the grid. FIG. 4d shows controls powered by 120 volt ac power from the generator. FIG. 4e illustrates various controls that operate from a combined grid and generator 24 volt DC power supply that is used when either the grid or generator is active. FIG. 4f shows the speed control circuits to handle various startup and load transfer conditions.

FIG. 6a illustrates grid/power supply switching without timing while FIG. 6b illustrates switching with a timing protocol.

Figure 1:
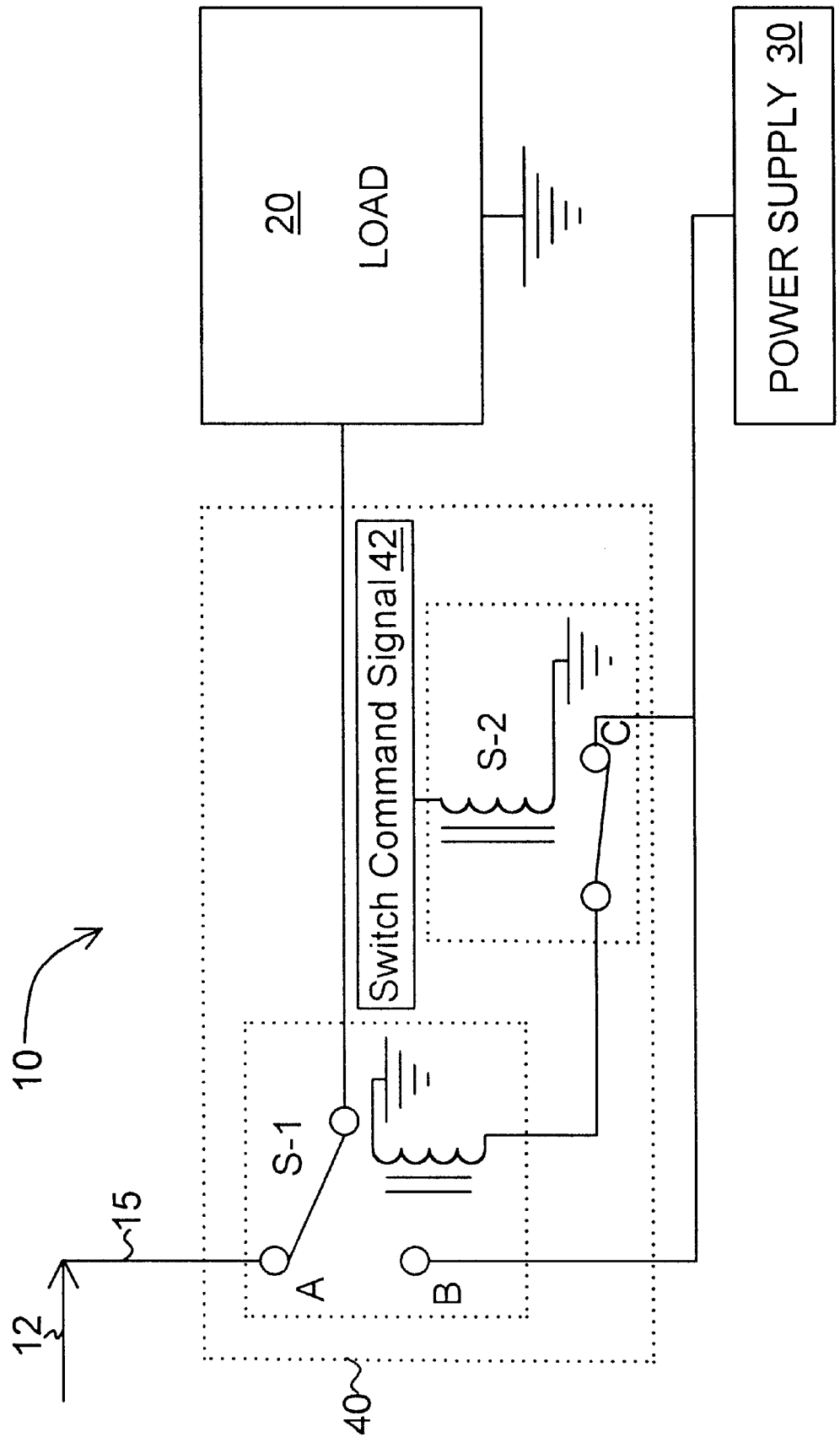
FIG. 1 is a schematic view of the power supply of the present invention illustrating the isolation and switching mechanism for transferring the load between the grid and power supply.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

In essence and with reference to the drawings and initially FIG. 1, the power supply of the present invention is designated generally by the numeral 10 and comprises a power grid conductor 15 connected to an electrical power grid 12 (hereinafter "grid") operated by an electricity provider such as a public utility, commercial supplier, government, private distribution network, or cooperative association, a load 20, an electrical power supply 30, and a switching mechanism 40 that: 1) isolates the grid 12 from the power supply 30 at all times, 2) connects the load 20 to the power grid conductor 15 for initial start up at high power draw, and 3) connects the load 20 to the power supply 30 after the initial high power draw has been met by the grid to provide a lesser, operating power draw.

One of the unique features of this invention not available with conventional standby power supplies is that the switch mechanism 40 allows a more cost-effective power supply 30 to provide running electrical power to device 20 after initial start up of device 20 from the grid. As a result, power supply 30 can be sized to meet the running requirements rather than the larger startup power requirements of device 20. That is, power supply 30 can be smaller than would be required to start load 20. This smaller size has the advantage of significantly reduced generator cost and improved operating efficiencies. In addition and as will be discussed below, a more refined switching mechanism 40 allows the power supply 30 to be used as a conventional standby power unit for critical power needs when a grid power failure occurs. Power supply 30 can use any suitable energy source (prime mover 24; see FIG. 2) including wind, hydro power, steam, solar, and fossil fuel sources, e.g., wind mills, gas turbines, fuel cells, photovoltaic cells, and engines including carbon-based fuel burning engines operating on such fuels as propane, gasoline, diesel, and natural gas. When the operating costs of power supply 30 are less than the cost of power from grid 12 as especially during peak grid demand times, switching mechanism 40 has the additional advantage of reducing peak energy costs.

As illustrated in FIG. 1, the switching mechanism 40 comprises an isolation and transfer switch S-1 that isolates grid conductor 15 from the power supply 30 and serves to transfer the load of device 20 from grid power via contact A to power supply power via contact B. Relay S-2 with contact C is used to control power transfer switch S-1. A switching command signal 42 applies a voltage to S-2 causing it to energize the coil of S-1 thus transferring the load 20 from the grid 12 to the power supply 30.

For initial start up of device 20, contact C is open (no voltage is applied to the coil of S-2) and device 20 receives start up power from grid conductor 15 via contact A in S-1. After start up, a switch command signal 42 applies a voltage to the coil of S-2 causing the coil of S-1 to activate and switch load 20 to power supply 30 via contact B. When device 20 is no longer operational, switch S-2 can be turned off, i.e., contact C broken, which removes voltage from the coil of S-1 and causes it to revert to its original position with contact A being closed awaiting the next start up power load of device 20. The switch command signal 42 can be as simple as an on and off switch that is manually activated. For loads with a predictable start up time, the switch command signal 42 can be the same device that turns on the load with a suitable subsequent time delay as may be provided by a device such as timer, electromechanical device, or electrical time delay circuit or even the time of the start-up sequence of power supply 30 prior to applying an activation voltage to the coil of S-2. Alternatively the switch command signal can be derived from the load itself. For example, if load 20 is a motor, an electromechanical device that produces an output signal that is proportional to the angular velocity of the motor shaft could serve as the switch command signal. In such a case, a switch command signal 42 would cause a voltage to be applied to S-2 only when the motor was at operational speed. Similarly a load current sensor could be used as a switch command signal for voltage application to S-2 allowing a voltage to be applied to S-2 only when the load is in a normal operating state and otherwise terminating voltage application to S-2 when the load is in a heavy current draw state (start up condition) or in a null current draw (off) state. Voltage may be applied to the coil of S-2 via the grid conductor 15, the power supply 30 or an independent power source such as a battery (not shown).

The power supply of the present invention is of particular utility when used with residential or commercial building air conditioning units constituting a major power load of the building. The present invention allows for a relatively small backup power supply 30 to not only provide backup electrical energy when there is a grid failure but also to provide an effective method of operating the air conditioning unit without the need for a large size power supply 30 to handle the startup power draw of the air conditioning unit. The use of power supply 30 is especially advantageous during periods of peak grid demand when energy costs are likely to exceed those of power supply 30 operation.

Figure 2:
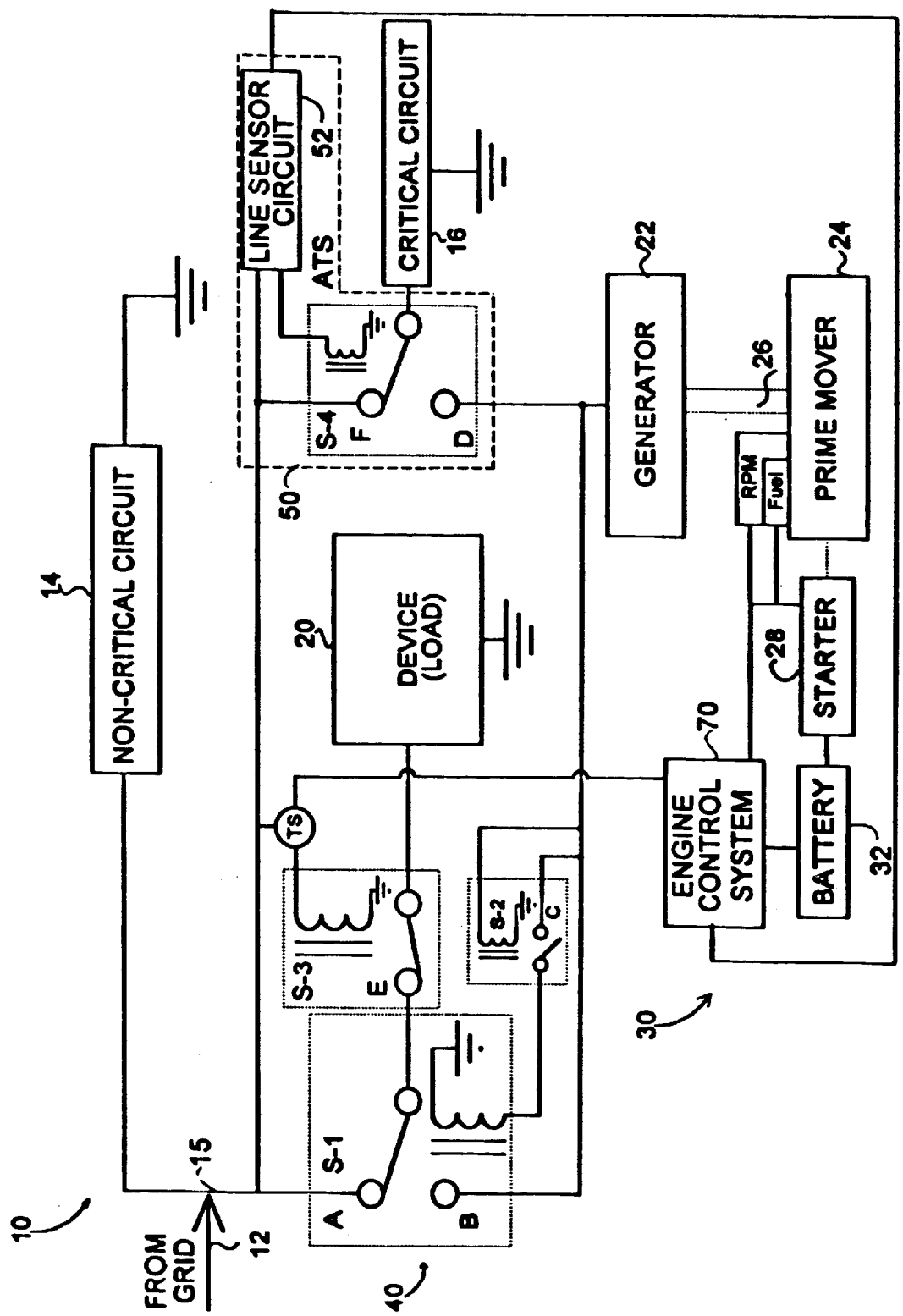
FIG. 2 is a schematic view of the power supply of the present invention further illustrating the use of the power supply as a backup source for critical circuits during grid power failure.

FIG. 2 illustrates the use of the power supply system of the current invention in a typical residential or commercial setting. Power from the grid is used for a wide variety of purposes including general outlet sources for general electrical needs, appliances, office equipment, medical equipment including life support and medication delivery systems, recreational and entertainment devices such as televisions, radios, CD players, etc., and various forms of lighting. Other purposes, rather than using an outlet source, are often permanently wired to the grid. Such purposes include heating, refrigeration, lighting, certain appliances, and other applications including a wide variety of industrial uses.

The various uses may be segregated into critical and non-critical needs. Non-critical needs typically refer to those electrical needs that result in no loss of life or injury to life or property should the grid fail to provide power. Such needs are supplied by "non-critical" circuits such as non-critical circuit 14. Critical needs refer to those electrical needs that may result in harm or loss of life or property in the event of power grid failure, e.g., heating, refrigeration, security systems, sump pumps, well pumps, medical and life support systems, etc. Such needs are supplied by "critical" circuits such as critical circuit 16.

In a third category are certain power using devices (typically large loads) 20 such as air conditioners, motors, heating coils, machinery and similar devices that use substantial amounts of electrical power. In addition, such devices typically have large start-up power requirements and then operate with a much smaller, running mode, power draw. Such equipment typically requires at least about one and a half times as much electrical power to start than to run with start-up power draws of three to six times operating power demand not being uncommon. To obtain maximum advantage of the present invention, such devices 20 are of a non-critical nature with a household air conditioning system being a good example of such a device.

It is to be realized that one or more metering devices and a load center with protective devices such as circuit breakers or fuses are typically used to distribute electrical power and protect the various circuits connected to the power grid through conductor 15. These are not shown for clarity sake, as those skilled in the art will recognize their construction, need, use and placement. Similarly, those skilled in the art will recognize that grid and power circuits are typically of higher voltage, e.g., 240 or 120 volt AC, while control circuits such as for solenoids in S-1 through S-4 are typically of lower voltage, e.g., 24 volt AC. Typically high grid or power supply voltage can be reduced to a lower control circuit voltage by use of a suitable step down transformer (not shown). Also typically the thermostat TS is located in a conditioned space away from the air conditioning unit, whereas the switch S-3 is typically located in the outdoor condensing unit of the air conditioner.

Presently backup systems are available for critical backup needs. These systems include a conventional automatic transfer switch (ATS) and standby generator sets that carry the critical circuits of a typical system during grid failure. Automatic Transfer Switches (ATS) are commercially available and include devices such as the Grainger's model no. 4W123, a 150 amp, 250 to 600 volts ATS. Other vendors also sell similar ATS's; all ATS's are available in a range of sizes from under 100 amps to over 400 amps. Conventional engine-driven generator sets are available from many sources including Grainger's (model nos. 4W117, 4W118, 4W119, and 4W121) and Kohler devices. Typically, the generator sets are fueled by natural gas, but propane, gasoline and diesel fuel models are available. Also, these generator sets include batteries for automatic starting and an engine control system that starts the engine on command, runs it to a preset speed (usually 3600 RPM, but 1800 RPM for 4 pole generators), and shuts the engine down on command. Many ATS's have a line voltage sensor circuit, or additional fault sensor circuits, to detect the need for standby power. These circuits are typically battery powered by a replaceable 9V battery.

The use of the current invention with typical backup generator operation may be understood by referring to FIG. 2. When the line sensor circuit 52 detects a valid line fault, i.e. one that lasts for more than a few seconds, the ATS 50 signals control system 70 to start engine 24 by closing a set of contacts in the ATS 50. The engine control system 70 then tries to start the engine generator set. When the ATS detects the presence of voltage from the generator set, the ATS 50 energizes the transfer coil in S-4 to activate and switch the critical circuits from contact F grid power to contact D generator power. When the grid power has been restored for more than a few seconds, the ATS 50 re-energizes S-4 to return the critical load to grid power 12 via contact F. The engine is typically allowed time to cool down for a few minutes before it is shutdown. The system is then ready for the next grid failure. Some standby generator sets include the line sensor circuit within the standby generator enclosure so that the electromechanical transfer switch S-2 may be driven entirely by control circuits in the standby generator. The Grainger's model 4W117 standby generator includes a transfer switch model no. 1ZCOO in its system. Standby systems are costly and little used, but they are essential where the critical loads are truly critical.

When combined with the switching mechanism 40 of the present invention, an ATS or even a simple relay switch such as S-4 provides not only a backup system for critical circuits 16 but also provides an effective means for using the backup power supply 30 as an energy source that eliminates the need for high cost grid power for large loads especially during periods of high-cost peak grid demand.

In view of the increased operating time of power supply 30 to service load 20, conventional backup generator sets having only a few thousand hours of operational life are inadequate for providing power to load 20 on a continual basis. As such, the conventional engine generator set must be replaced by a long-life power supply 30. Power supply 30 includes a prime mover(engine) 24, a generator 22, a battery 32, a starter 28 and a control system 70.

As noted previously, the prime mover 24 can use any suitable energy source including wind, hydro power, steam, solar, and fossil fuel sources, e.g., wind mills, gas turbines, fuel cells, photovoltaic cells, and engines including carbon-based fuel burning engines operating on such fuels as propane, gasoline, and natural gas. Because of its high efficiency, long-life, and natural gas fuel source, the lean-burn internal combustion gas engine described in U.S. Pat. No. 5,230,321, all of which is incorporated by reference as if completely written herein, is particularly well suited as a prime mover for this invention. Such an engine is typically started with a battery-operated starter 28 using battery 32. The generator 22, prime mover 24 and associated couplings, connectors, starter 28, battery 32, and the control system 70 are referred to collectively as electrical power generation device 30. The basic fuel is intended to be natural gas, but propane may also be readily used.

A switching mechanism 40 (generally one or more of the switches shown within one or more of the dotted frames)

isolates the power grid from generator 22 at all times, connects the power grid 12 to the load 20 during startup, and then connects the generator 22 to the load 20 after the high power draw of the initial startup of load 20. In this basic operation scheme, switch S-1 is initially and normally closed to position A to start device (load) 20, e.g., an air conditioner. The air conditioner is started by a call for cooling from the thermostat TS. The call for cooling from TS also initiates a sequence of events in the engine control system that starts the engine 24 and engages generator 22 and brings it up to operating frequency and voltage. Typically the time interval for engine startup and production of a satisfactory output voltage is sufficient for initial air conditioner start-up, that is, when the power draw drops from an initial high power draw value to a value near to or at about the running draw of device 20. At that point, output voltage from generator 22 conditioned for low-voltage coil operation of S-2 causes contact C to close and provide a low voltage to the coil of switch S-1 causing S-1 to switch to position B to connect generator 22 to load 30 to provide running mode power. As will be appreciated by those skilled in the art, switching can be accomplished in a variety of ways including actuation using a wide variety of instrumentalities including electromagnetic relays and contacts, vacuum and gas filled electronic tubes, semiconductors including rectifiers and transistors, computer control, and even manual switching.

Figure 3:
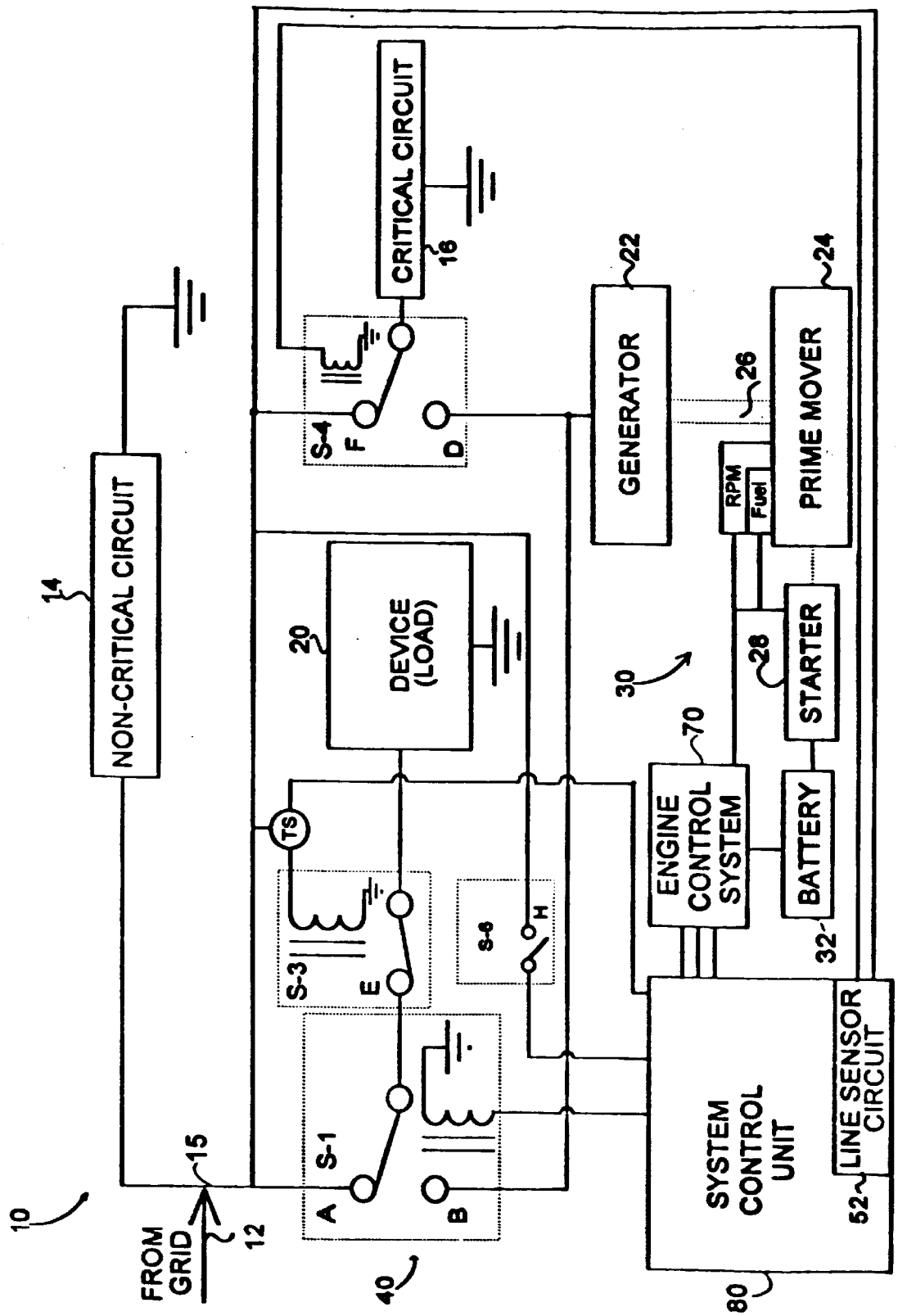
FIG. 3 is a schematic view of the power supply of the present invention further illustrating the use of a system control unit to determine which of two operating modes to use and determining the best time to switch between the two modes of operation.

As shown in FIG. 3, S-1 is normally closed to position A, i.e., connected to the grid 12 via conductor 15. The device 20 turns on according to its own control system, TS and S-3. Assuming device 20 is an air conditioner, a thermostat TS turns device 20 on when the temperature rises above a certain value. Because S-1 is closed to the grid, the electrical power required for start-up is obtained from the grid 12. After device is at or near its operating power draw, S-1 is switched to position B, which allows device 20 to receive its running power from generator 22. After the air conditioner device has cooled the space to the required temperature, a thermostat opens a switch in device 20 causing it to stop. This also signals the system control unit 80 to terminate the operation of power supply 30, and after a short cool-down period, the prime mover 24 is shutdown.

FIG. 3 shows a system control unit 80 with the inclusion of a line sensor circuit 52 so that a simple, electromechanical switch may be used such as S-4 to eliminate the need for a complete ATS unit. The system control unit 80 provides the essential functionality to allow this device to work as intended. The system control unit has two functions: 1) determining which of two operating modes (grid 12 or generator 22 power) is to be used, and starting the power supply 30 accordingly, and 2) determining the best time to cause S-1 to switch contacts from A to B. The first function along with the logic and hardware needed to accomplish this function is set forth initially. While the invention can operate with only the first function, additional operational reliability is obtained by adding the second function. Once the first function has been described, the second function will be described along with the associated hardware.

Figure 4A:
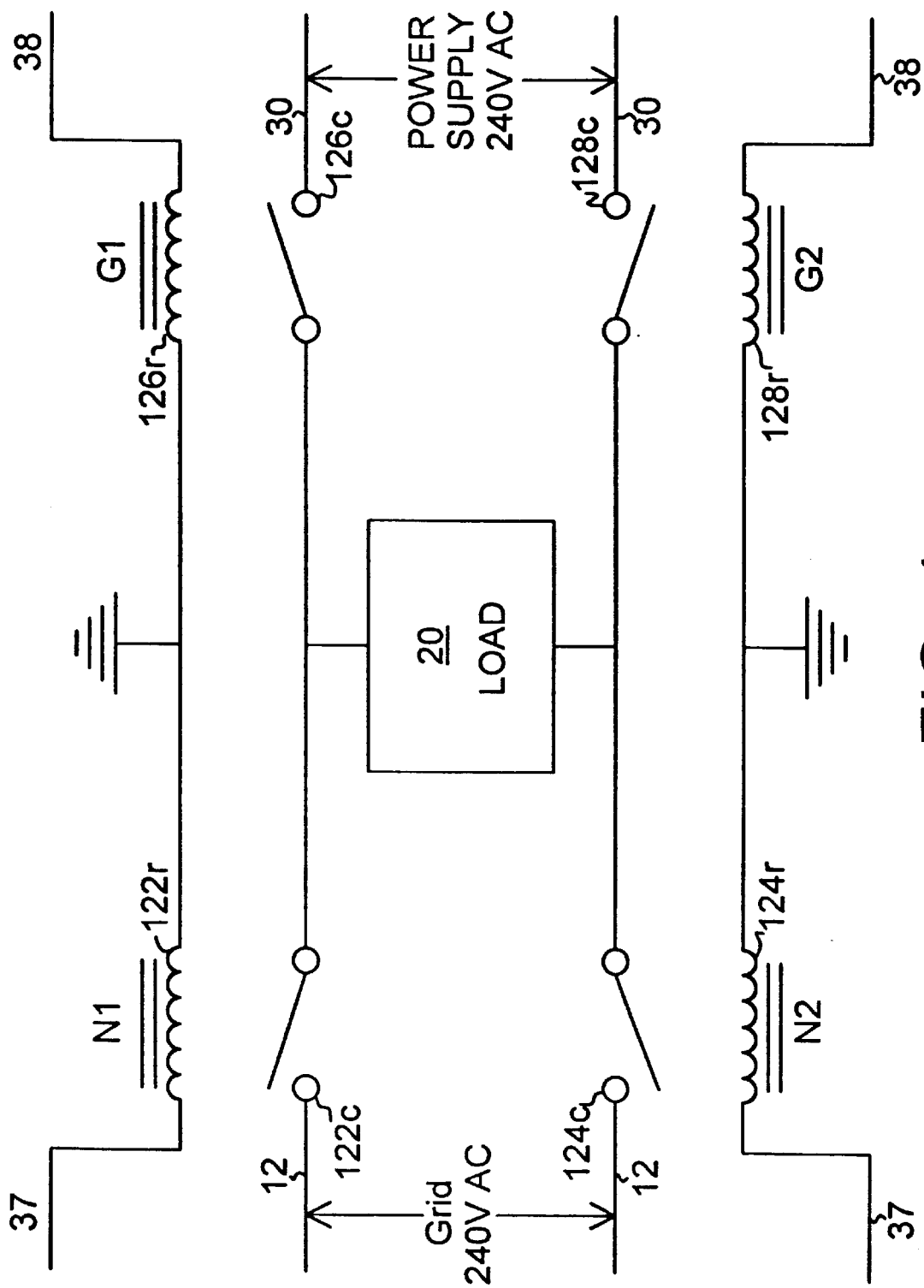
FIGS. 4a–f are schematic views showing the detailed function, logic, and hardware to carry out the switching function.

FIG. 4a shows a further detail of switch S-1 of FIG. 3. Device 20 is shown as an air conditioner being supplied power through two conductors 12 having a 240 volt potential across them. Typically, air conditioners in the U.S. operate on 220 to 240 volt, 60 Hz AC power, with a separate neutral connection, not shown. The object of S-1 is to connect the air conditioner to either the grid 12, or to the generator 22, but to never connect the grid 12 to the generator 22 directly. Four single pole switches, N1, N2, G1, and G2 provide the connection in response to control voltages applied to wires 37 or 38. By never applying voltage to both of these wires at the same time the connection of grid and generator is prevented. FIGS. 4b through 4f show the control logic and hardware needed to provide the control voltages to wires 37 and 38, as well as to control the running of the power supply 30.

Figure 4B:
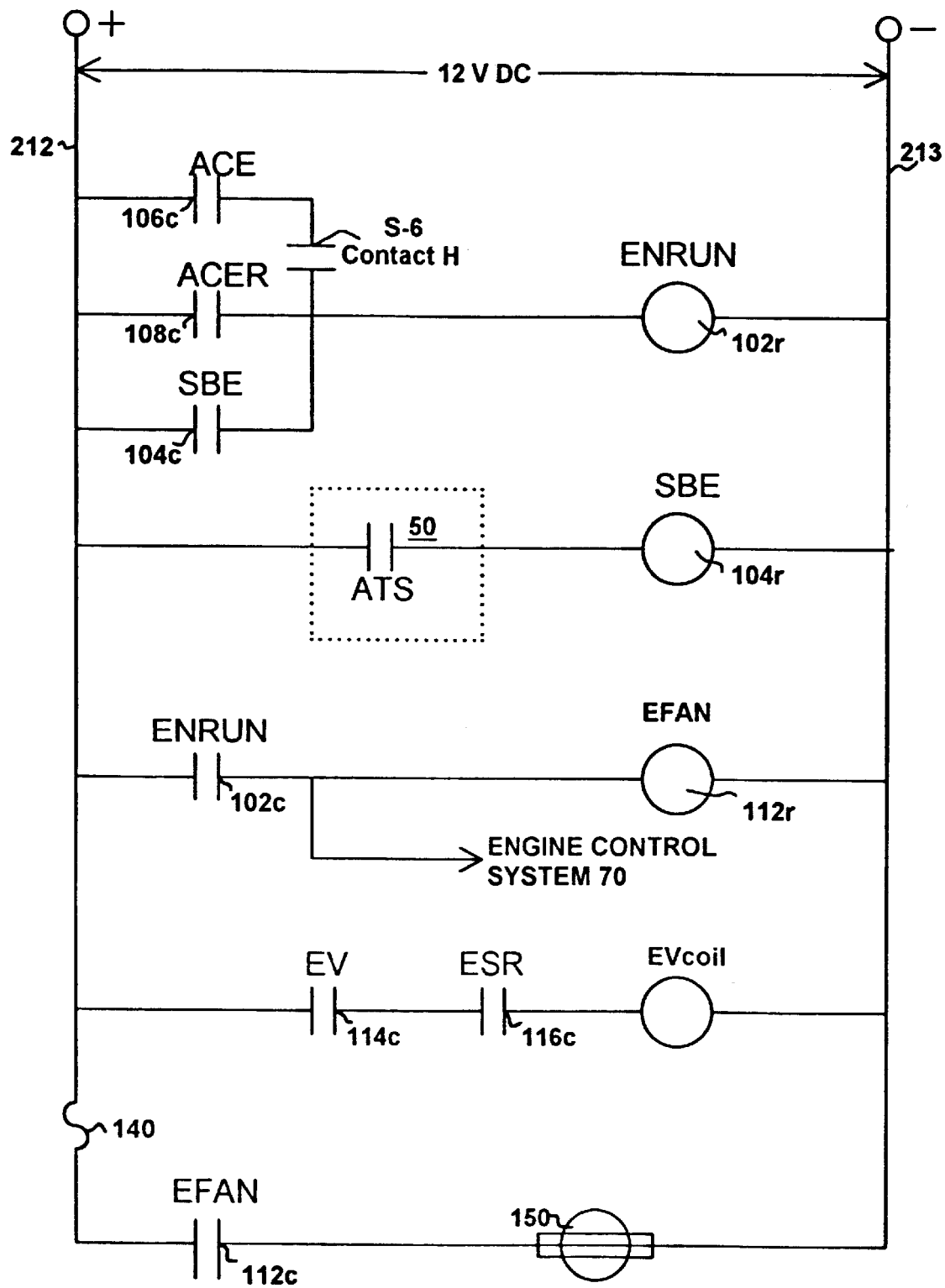

FIG. 4b shows a 12 volt control circuit for use with the present invention. This circuit shows a number of relay coils (circles) and contacts (parallel vertical lines) either with a slash across the contacts for normally-closed contacts (NC) or without the slash for normally-open contacts (NO). The normally-closed contacts NC conduct electricity when the relay coil is not energized. The relays used typically have up to four sets of contacts, so the contacts for a single relay can appear several places in FIGS. 4b through 4f. Relay coils are typically designated with a numeral followed by an "r" while the contacts associated with a particular relay are given the same identifying number followed by a "c".

The primary relay in this system is ENRUN 102r. This relay causes the engine 24 to be run to 3600 RPM for power generation. ENRUN 102r can be energized by any one of three relays, SBE 104r, ACE 106r, and ACER 108r. SBE 104r is the relay that is energized by a remote set of contacts in the ATS 50. The ATS contacts close when the ATS line sensor circuit determines that the grid power has been interrupted for more than a preset time, such as 30 seconds. As later discussion will show, closure of the ATS contacts will cause the device (load) 20 to be disconnected from the generator 30, so the generator can be used to supply power to the critical circuit(s) 16. Relay ACE 106r is closed by the thermostat 170 (TS on FIG. 3); this closure starts the air conditioning cycle. The contact H of external switch So acts to allow or inhibit engine startup for air conditioning. If contact H is open the air conditioner will run normally but the engine cannot start.

As seen, one of the features of the present invention is that it allows various large power devices 20 such as an air conditioner to be started from the grid during its initial large power draw and then switched to generator 22 for operation during its lower-power draw operating mode. The basic premise for such a switch over is that the cost and operation of the electrical power generation device 30 is less than the cost of purchasing power from the grid. This is even more likely to be so with the advent of variable pricing for power from the grid 12. Grid power can be expected to be more costly during certain seasons, e.g., the summer peak air conditioning periods, and during certain peak periods of the day, e.g., late morning and afternoon. However, the grid may be able to provide lower energy costs during non-peak periods. As such, there may be certain times when it is less costly to operate the device in both start-up and in running mode from the grid rather than to engage the generator for running mode energy needs. Similarly, grid power costs may well exceed the more modest costs of operating the generator during times of peak grid energy demand. To this end, the switching mechanism of the current invention features a switching device such as switch S-6 which allows the power generation device 30 to remain off during certain predetermined periods of lower grid power cost. To this end, the switching mechanism 40 employs switch S-6 to meet the variable grid power cost parameter. As shown, when the moveable contact of switch S-6 is open to contact H, the engine is not allowed to receive a start command from relay ENRUN even though the thermostat is calling for cooling via relay AC. Switch S-6 may be operated manually, from a timer device, from an input signal delivered by computer, phone, satellite, or from other suitable control means. Since relays AC 118r, ACE 106r, and ACP 167r are energized, the grid switches (N1 and N2) for the load 20 are energized and the grid powers the load.

Relay ACER 108r keeps the engine running at full speed for a short time after the thermostat is satisfied and ACE 106r has been de-energized. Relay ENRUN 102r has contacts to energize relay EFAN 112r and to supply 12 volt power to the engine control system 70. The relay EFAN 112r closes a set of contacts to power the radiator cooling fan motor 150 for the engine 24. The 12 volt circuit also includes contacts EV 114c and ESR 116c, and the coil, EVcoil, for the enrichment valve. The enrichment valve allows extra fuel to flow to the engine, allowing it to develop maximum power. Since the radiator fan motor can draw a high current and could be stalled by an obstruction in the fan blades the fan power flows through a protective fuse 140.

Figure 4C:
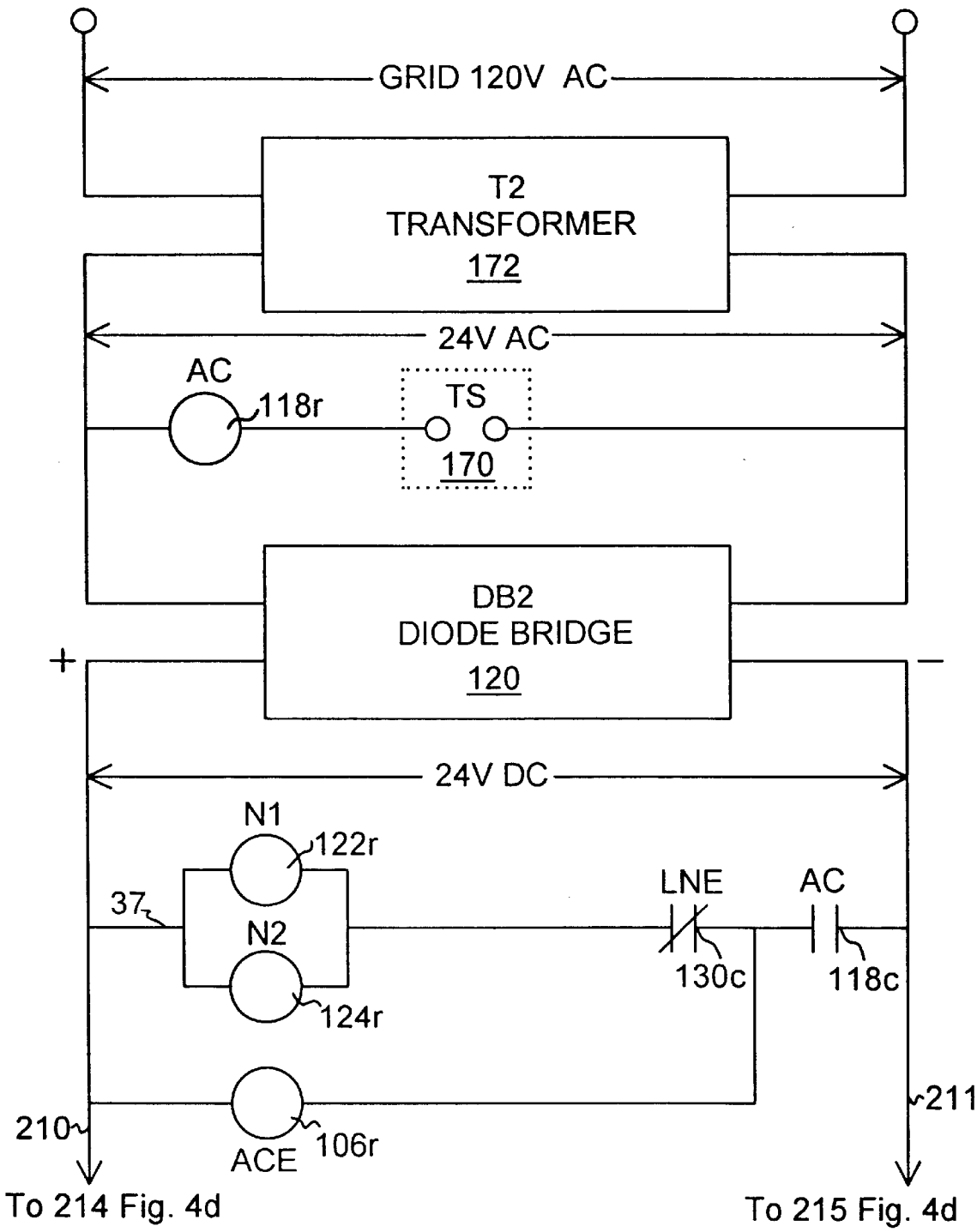

FIG. 4c shows the control circuits that are powered exclusively by the 110–120 volt ac power from the grid, referred to as line power. The first component is a 120 to 24 volt transformer T2 (172), which in many systems can be the 24-volt transformer used in the conventional heating, ventilating, and air conditioning (HVAC) system. As in a conventional HVAC system, the transformer powers the thermostat, TS (170). However, in the present invention the cooling contacts are rewired to only power the coil side of relay AC 118r. Thus whenever TS 170 calls for cooling, AC 118r is energized. The final component in the line power 24 volt circuit is an AC to DC rectifier, DB2 (120). This rectifier provides power to the NO contacts of AC 118c to energize the coil of ACE 106r, and energize switches N1 122r and N2 124r through the NC contacts of LNE 130c. Since N1 and N2 connect device 20, e.g., the air conditioner, to line power (as shown in FIG. 4a), this provides the means to start the air conditioner on grid power. It will later be shown that LNE 130r is not initially energized when air conditioning is needed. The line derived 24 volt DC power is also fed to other controls which can operate off either line power or generator power, whichever is available.

Figure 4D:
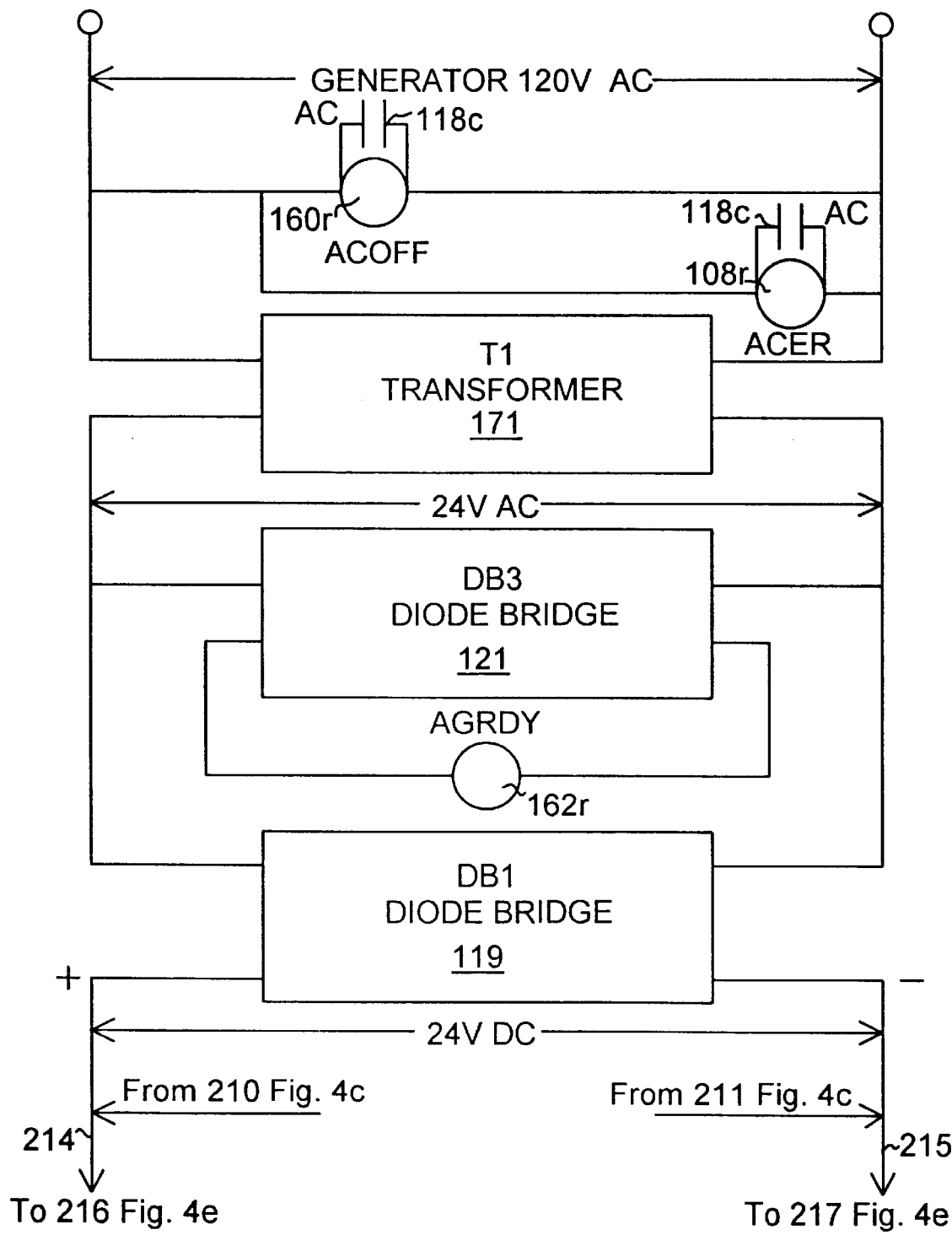

FIG. 4d shows the controls powered by 120 volt AC power from the generator 22. The full voltage is used to operate two time-delay relays, ACOFF 160r and ACER 108r which are readily available only with 120 volt coils. Both relays are of the "Delay On Break" (DOB) type, meaning that they begin their time delay action after a specific set of contacts are opened. For both ACOFF 160r and ACER 108r, those contacts are a set of NO contacts on AC 118c. ACOFF 160r is nominally set for a 30 second delay and ACER 108r is nominally set for a 60 second delay. Relay ACOFF 160r is energized as soon as relay AC 118r is energized and the generator output voltage rises above about 80 volts. When relay ACOFF 160r reaches the end of its delay period, it de-energizes and allows the air conditioner (load) 20 to stop running on generator power and it allows the indoor blower in the HVAC system to stop running. The time delay on ACOFF 160r is chosen to be nearly the same duration as the delay in the ATS in responding to a power fault. Thus, if there is a short duration, less than 30 second, grid power fault or failure, the air conditioner will keep running steadily on generator power during the outage. This feature will eliminate many unnecessary stops and starts on the air conditioner. Especially, it will eliminate the attempts the air conditioner 20 would otherwise make to restart under a high load. This feature should provide longer life for the air conditioner and provide steadier cooling for the user. Relay ACER 108r actually shuts down the engine 30 seconds after the air conditioner stops, allowing a short time for no load cooling of the engine.

The generator 120-volt AC power is passed through a 120 to 24 volt transformer T1 (171) and a 24-volt rectifier (DB3) 121 to provide power to relay AGRDY 162r. This relay is energized when the generator voltage rises above about 80 volts, thus providing a signal that the generator is essentially ready to accept a load. DB3 121 is used for only this one relay to minimize the possible adverse impact of noise from other relay closures on AGRDY 162r.

Figure 4E:
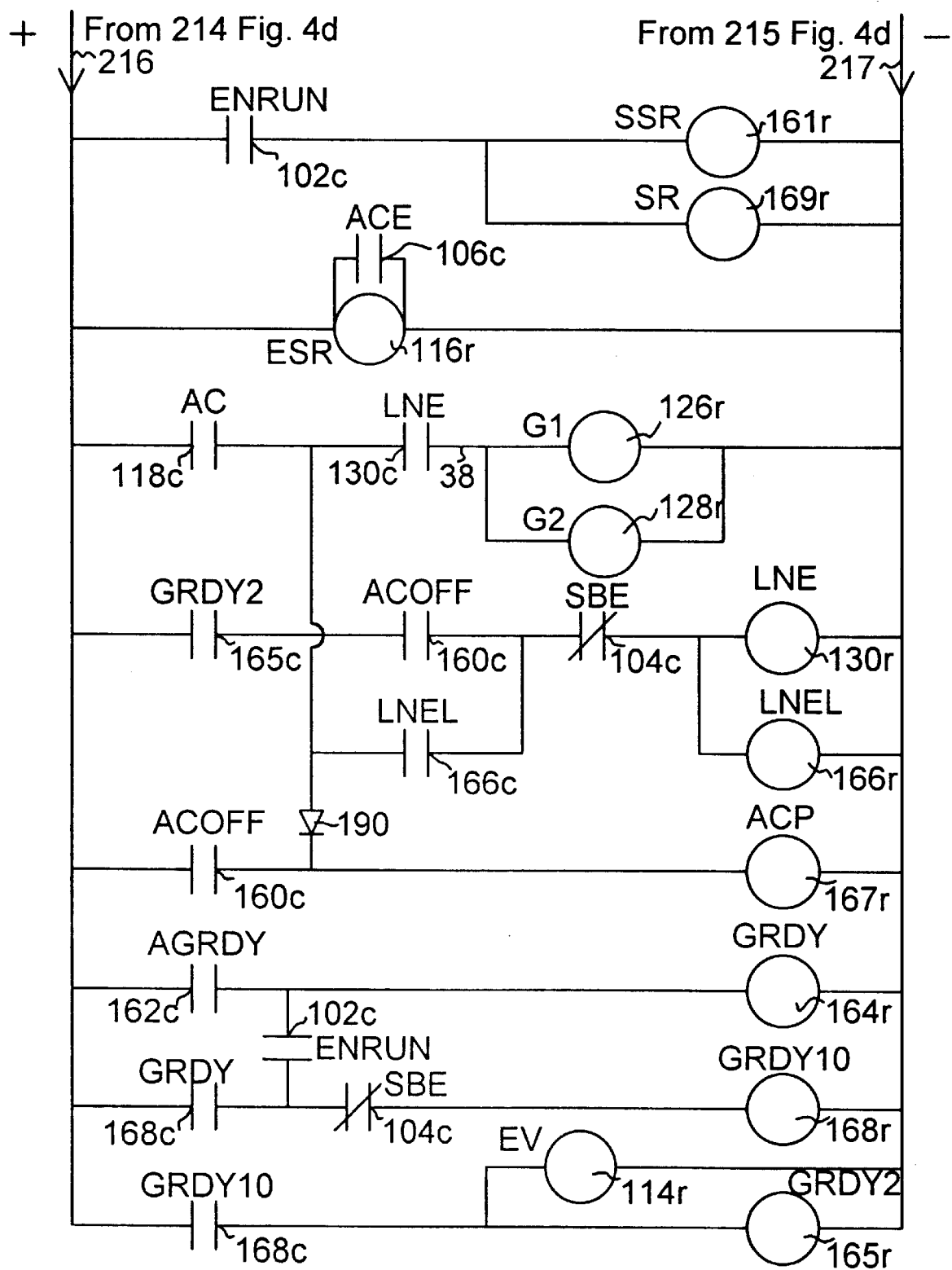

The generator 24-volt power is also supplied to rectifier DB1 (119), to provide 24-volt DC power for additional controls. FIG. 4e shows those controls that operate from a combined 24-volt DC power supply. These controls have power when either the grid is active or the generator is operating. Specifically, the controls remain active when a grid failure occurs during the time that the generator is powering the air conditioner. Use of this combined power supply helps allow the generator to power the air conditioner during brief grid faults.

Relays SR 169r and SSR 161r are energized through a set of NO contacts on ENRUN 102c. Thus, these relays are energized whenever the engine has been commanded to start and run: their functions will be described later. This circuit powers relay ESR 116r, a DOB relay. ESR 116r is energized by closure of the NO contacts of ACE 106c, so ESR 116r is energized with each call for air conditioning. ESR 116r has a nominal 20 second delay, so it de-energizes 20 seconds after the thermostat is satisfied. As discussed later, when ESR 116r is de-energized it allows the engine speed to drop from 3600 RPM to about 3300 RPM to allow for quieter stopping of the air conditioner.

The next section of controls is used to make the actual switching of the air conditioner (load 20) from grid power 12 to generator power 30. In addition to switching the air conditioner load 20 from one power source to the other, this circuit also latches the air conditioner 20 to the generator during short grid power interruptions, which will open the NO contacts of AC 118c. This circuit also allows a call for standby power to interrupt the generator power flow to the air conditioner load 20. The essential function is provided by relay LNE 130r. When LNE 130r is energized, power flows through AC (closed by the thermostat), through LNE NO contacts to switches G1 and G2. Referring to FIG. 4a, it will be seen that closing G1 and G2 will power the air conditioner from the generator via wires 30. Reference to FIG. 4c will show that when LNE 130r is energized, its NC contacts 130c will open and so will switches N1 and N2, thus disconnecting the air conditioner from grid power in wires 12. Relay LNE 130r is energized through the NO contacts of ACOFF 160c and GRDY2 165c and the NC contacts of SBE 104c. Since the SBE contacts 104c are closed except when there is a need for standby power, and ACOFF 160r is energized by the thermostat, LNE 130r is energized when relay GRDY2 164r is energized (this occurs a nominal 12 seconds after AGRDY 162r signals that the generator is nearly ready for loading). Relay LNEL 166r is energized by the same conditions as is relay LNE 130r. Relay LNEL 166r is a latch for LNE 130r, protecting LNE 130r from possibly dropping out if a temporary start-up load on the generator should temporarily lower the voltage to relay AGRDY 162r and allow it to open briefly. Once LNEL 166r is energized, it provides power to itself and LNE 130r as long as AC 118r is energized, hence it's "latching" function.

Relay ACP 167r provides the contact closure needed to turn on the indoor blower used to circulate air from the air conditioner evaporator coil through the conditioned space. ACP 167r is initially energized from contacts on AC 118c through a diode 190. The blower is kept running for 30 seconds after the thermostat is satisfied by also powering ACP 167r through a set of NO contacts on ACOFF 160c. The diode 190 prevents power from ACOFF from feeding back through the contacts of LNEL 166c and bypassing the contacts on GRDY2 165c.

Relay AGRDY 162r provides power to energize relay GRDY 164r, which is latched in with power through a set of its own contacts and a set of NO contacts on ENRUN 102c. Thus, once energized, GRDY 164r can only be de-energized by de-energizing ENRUN and stopping the engine. The NO contacts of GRDY 168c also energize a time delay relay, GRDY10 168r, with a nominal 10-second delay in closing its contacts after being energized. This time delay provides additional opportunity for the engine to accelerate to its high idle speed of 3300 RPM (nominally). When the GRDY10 contacts 168c close, time delay relay GRDY2 165r is energized along with the enrichment valve relay (EV) 114r for the engine. When both EV 114r and ESR 116r are energized, the engine receives additional fuel flow for higher power output (see FIG. 4b). When GRDY2 165r closes its contacts, relay LNE 130r is energized and the transfer of the load 20 from the grid 12 to the generator 22 is made.

Figure 4F:
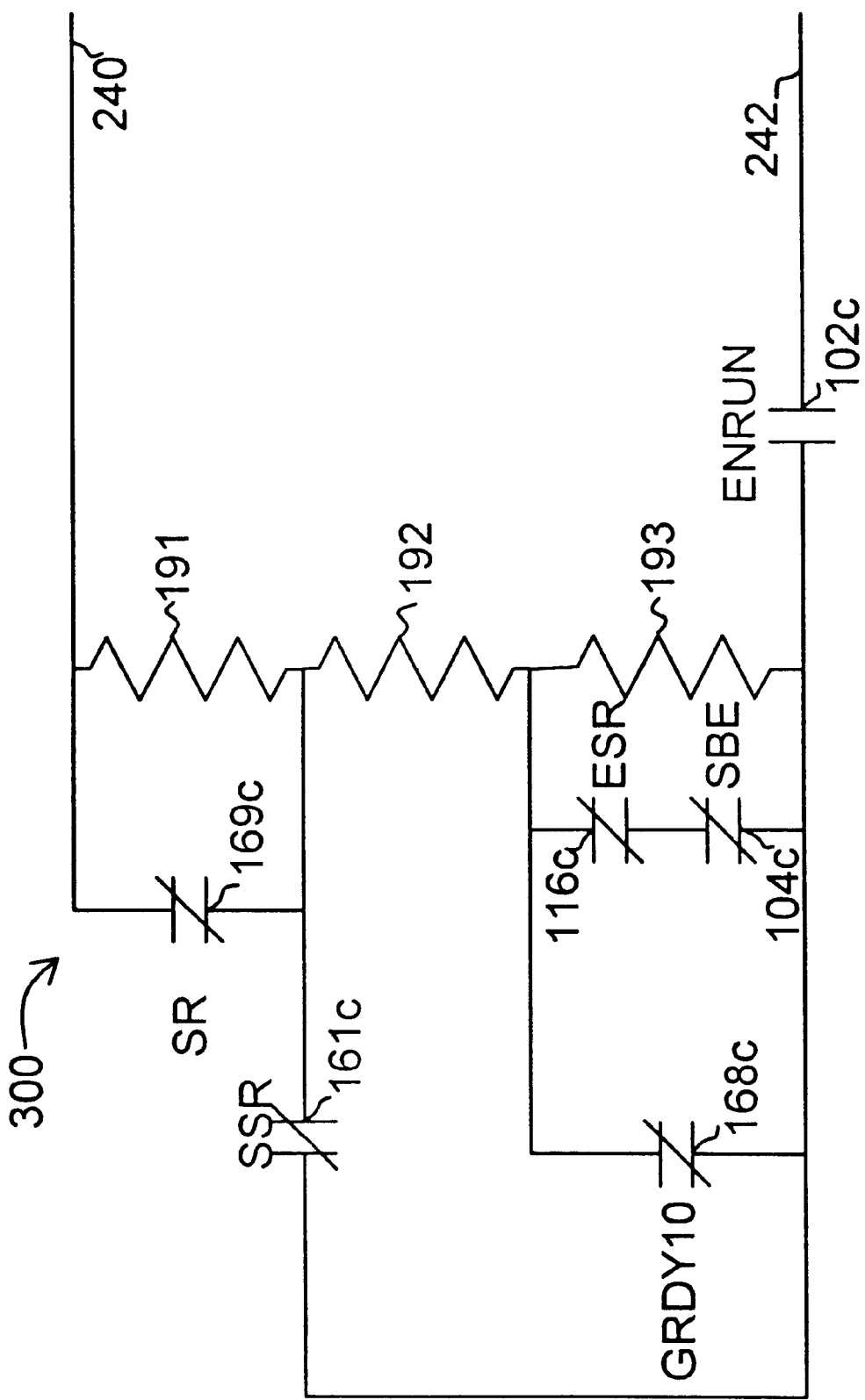

It is to be appreciated that when generator 22 is engaged to provide power to device 20, the sudden and substantial load placed on generator 22 as it goes from a no-load to a heavy load condition is substantial and can cause slowing or even stalling of the prime mover 24. In order to minimize this loading effect, it is desirable to increase the speed (RPM) of the prime mover and enrich its fuel supply immediately prior to electrical connection of generator 22 with the load 20. To this end, the present invention features starter circuitry that increases the engine speed (RPM) just prior to switching the load and also enriches the fuel supply to the prime mover also just prior to the connection to the load. The above discussion shows how the relays GRDY 164r, GRDY2 165r and GRDY10 168r are use to time the load transfer and the opening of the enrichment valve. These same relays also control the engine speed command signal that is sent to the engine control system 70 to actually change the operating speed of the engine and generator. FIG. 4f shows the speed control circuits 300. Speed control on the engine 24 used for the prototype of this invention is by way of an analog voltage signal. The engine control system 70 provides a DC current source and responds to a voltage across two terminals connected to that current source 240, 242. Thus a resistor of the proper value results in a speed command for the engine in the range of 1300 RPM to 3600 RPM. Those skilled in the art will recognize that for other types of engine control systems different types of speed command signals can be as readily applied. The circuits in FIG. 4f show a series of three fixed value resistors connected in series with a set of NO contacts on relay ENRUN 102c. When ENRUN 102r is energized, these resistors are subjected to the current flow from the engine control system (ECS) 70. The total resistance value of 2500 ohms was chosen to give a maximum engine speed of 3600 RPM. Various sets of relay contacts are used to short out each of the three resistors to give operating speeds of 1300 RPM (for starting), 3300 RPM (for fast idle and imminent load shedding) and 3600 for loaded operation. The engine responds to a speed command for about 1300 RPM as a start signal if the engine is not yet running. Thus energizing ENRUN connects the speed control circuit to the ECS and energizes time delay relay SR 169r (FIG. 4e). A nominal 2 second on-delay in SR allows the ECS 70 to recognize that the speed control circuit is connected, since one set of contacts on ENRUN 102c also powers the ECS 70 from the battery. Two seconds after SR 169r is energized, its NC contacts 169c open and the 900 ohm resistor 191 is no longer shorted. The ECS 70 recognizes the resulting voltage as a start command and the standard start sequence is begun. The ECS makes the starter crank for 10 seconds, followed by a 5 second rest. A total of five such crank/rest cycles are used to try to start the engine automatically. Failure to start results in an alarm and the need for manual resetting of the ECS 70.

Relay SSR 161r is also an "on-delay" relay with a nominal delay of 45 seconds. Thus 45 seconds after SSR is energized by ENRUN 102r, the NC contacts on SSR 161c open and a 1400 ohm resistor 192 is added to the speed control circuit because it is no longer shorted. The total resistance of 2300 ohms results in a speed command for 3300 RPM, the high idle speed. At this speed, the generator can operate at 55 Hz and over 100 volts, so a relay AGRDY 162r will be energized when the engine approaches 3300 RPM. When relay GRDY10 168r reaches the end of its 10 second time delay, its NC contacts 168c open and the final 200 ohm resistor 193 is unshorted resulting in a 3600 RPM speed command about 2 seconds before the load is transferred to the generator. The ECS 70 is sufficiently slow in responding (as is the engine) so that the throttle is still moving to a more open position (in response to the 3600 RPM command) when load transfer occurs. Thus the engine is able to accept the load with a more open throttle setting than it would have had if the speed increase command not been issued just before load transfer. During the final acceleration to 3600 RPM, relays SBE 104r and ESR 16r have no effect since ESR 116r is energized during this time and its NC contacts 116c are open.

Air conditioner shut down is driven by the thermostat 170 being satisfied which opens its cooling contacts. Relays AC 118r and ACE 106r are immediately de-energized and the time delays on relays ACOFF 160r, ACER 108r, and ESR 116r begin timing out. ESR 116r times out first and de-energizes, allowing its NC contacts 116c to close. This closure shorts out the 200-ohm resistor 193 in the speed control circuit 300 dropping the engine speed to 3300 RPM and closing the enrichment valve. In another 10 seconds, ACOFF 160r times out and the air conditioner load 20 is dropped when G1, G2, LNE, and LNEL open. Relay ACP 167r is de-energized at this same time and the indoor blower is allowed to stop. Relay ACER 108r times out in an additional 30 seconds, de-energizing ENRUN 102r and allowing the engine 24 to stop by removing its speed command signal (FIG. 4f).

Assuming that the electrical power using device 20 can be discontinued during grid power outages, switch S-4 switches the power source for critical circuit 16 from the grid conductor 12 to the electrical power generation device 30 (FIGS. 2 and 3). Provided S-4 maintains the grid and generator in isolation from each other, any suitable automatic switching device (ATS) 50 may be used for switch S-4 to provide the appropriate switching between the grid 12 and generator 22.

Two conditions must be handled by switching mechanism 40 if load 20 is to be shut off during grid power failures: 1) a condition where the load is being supplied power from generator 22 during running mode and 2) the condition where load 22 is not operational or is in the starting mode using power from the grid prior to start up of the power generation device 30. For the situation where the generator 22 is supplying power to the load 20 for normal running mode operation after startup, a power loss on the grid causes contacts ATS to close energizing relay SBE 104r. If the engine 22 is running and SBE 104r is energized, SBE will keep the engine running at full speed until the standby condition is cleared. However, as shown in FIG. 4e, when SBE 104r (FIG. 4b) is energized, it's NC contacts 104c open and the power feed to relays LNE 130r and LNEL 166r is positively interrupted, de-energizing switches G1 126r and G2 128r. When these switches are de-energized, the air conditioner 20 stops. The loss of grid power 12 will de-energize relays AC 118r, ACOFF 160r, ACE 106r, and ACP 167r allowing the air conditioning controls time to reset and the indoor blower to stop long before the restoration of grid power can trigger another call for an air conditioner startup. Since the engine is running at full speed, frequency and output voltage, an ATS can immediately recognize that the generator is ready to be loaded and the conventional ATS will activate switch S-4, opening contact F and closing contact D. Normal standby operation continues until grid power is restored, at which time the ATS contacts open de-energizing relay SBE 104r. If the thermostat is calling for cooling before SBE 104r is de-energized, then relays AC 118r, ACE 106r, ACOFF 160r, ACP 167r, GRDY 164r and AGRDY 162r will also be energized and the air conditioner will be running on grid power via switches N1 122r and N2 124r. An extra set of NC contacts on SBE 104c are used to return the engine to 3300 RPM operation and reset relays GRDY2 and GRDY10. The transfer of the load to the generator then follows the acceleration and transfer process described above.

In the situation where the power generation device 30 is not running, a loss of power from the grid 12 produces a loss of voltage in the line sensor circuit 52 of the ATS 50 resulting in the closure of contact ATS (FIG. 4b). This contact closure energizes relay SBE 104r and subsequently relay ENRUN 102r. As described above, ENRUN energizes the engine cooling fan 150 and the engine control system 70. The ATS awaits the generation of power output voltage from the generator 22 and then causes the contacts of switch S-4 to move from F to D. This places the load of the critical circuit 16 on the generator 22 until grid power is restored and has been detected by the line sensor circuit 52 in the ATS 50. Once grid power 12 has been sensed, contacts ATS open, SBE 104r and ENRUN 102r are de-energized and the engine 22 shuts down unless there is a call for air conditioning via the thermostat 170 and relays AC 118r and ACE 106r.

As will be appreciated by those skilled in the art, only battery power is available at the generator 22 immediately upon loss of grid power 22 under these conditions. The starting sequence must be initiated and the prime mover 24 and generator 22 come to speed. Commercially available automatic transfer switches incorporate sensing circuitry that determines when a true grid failure or fault has occurred and provides an appropriate signal to commence the starting sequence and then determines that the generator has developed sufficient potential for the transfer of the critical circuit 16 to the generator 22 to be made.

The switching mechanism 40 can also provide emergency backup power for critical circuit 16 when the power grid is off. Typically the switching mechanism 40 disconnects load 20 from the power generating device 30 when the grid goes down; power generating device 30 then is used to provide emergency backup power to one or more critical circuits 16. However, this is not absolutely necessary especially if the power using device 20 is of a critical nature and the power draw from the critical circuit 16 is small. Although the power generation device 30 can be slightly oversized to meet both needs, it is to be realized that such over-sizing, especially if significant, defeats the cost and efficiency factors that are achieved by sizing the power generation device 30 to meet only the running mode power requirements of the power using device (load) 20 when the grid is active and then used only for critical circuits 16 when the power grid is off.

Figure 5:
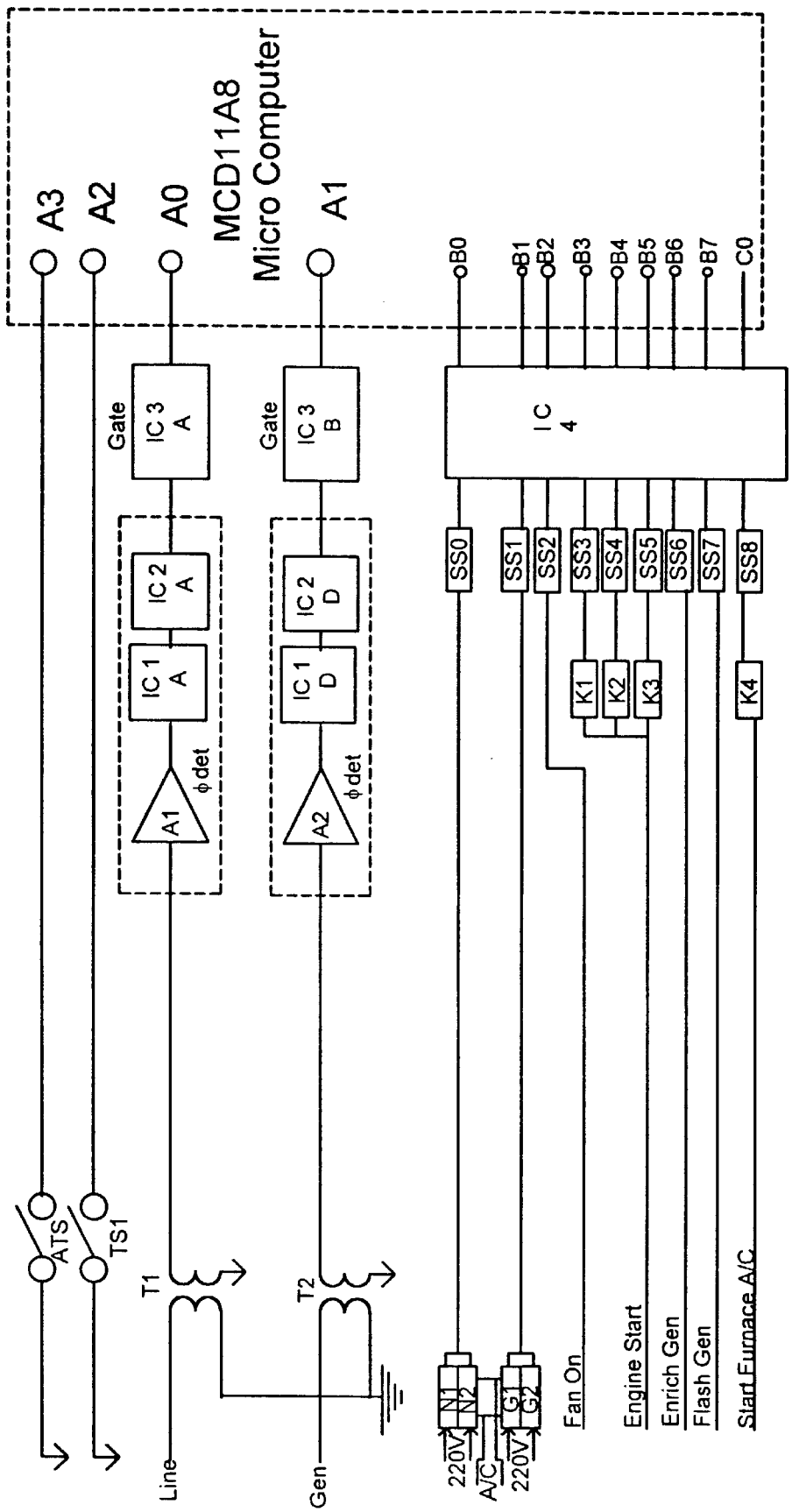
FIG. 5 is a schematic view illustrating the switching function using a microcomputer.
Figure 6A:
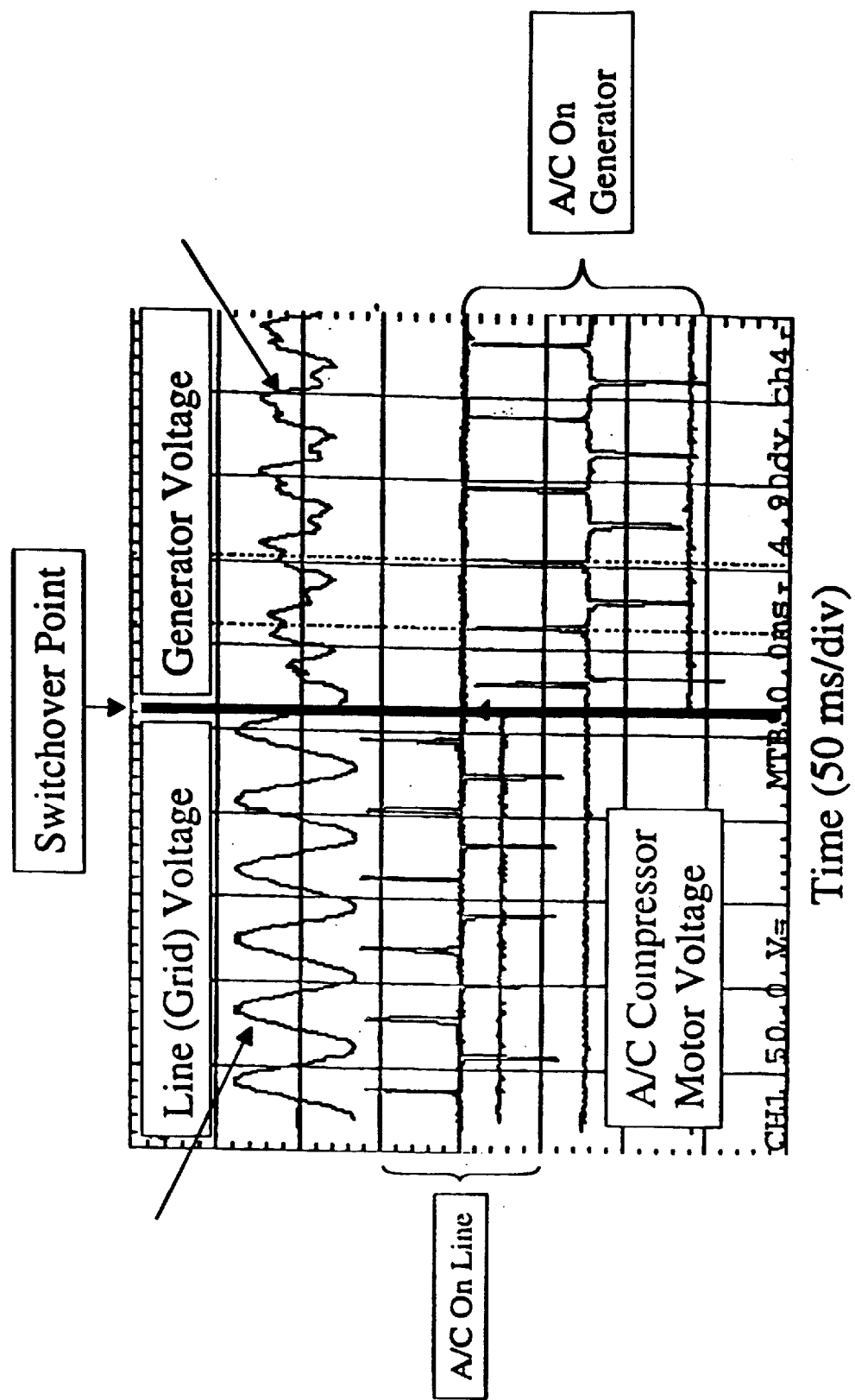
FIGS. 6a–b are signal traces showing the improvement in grid/power supply switching achieved with a timing protocol.
Figure 6B:
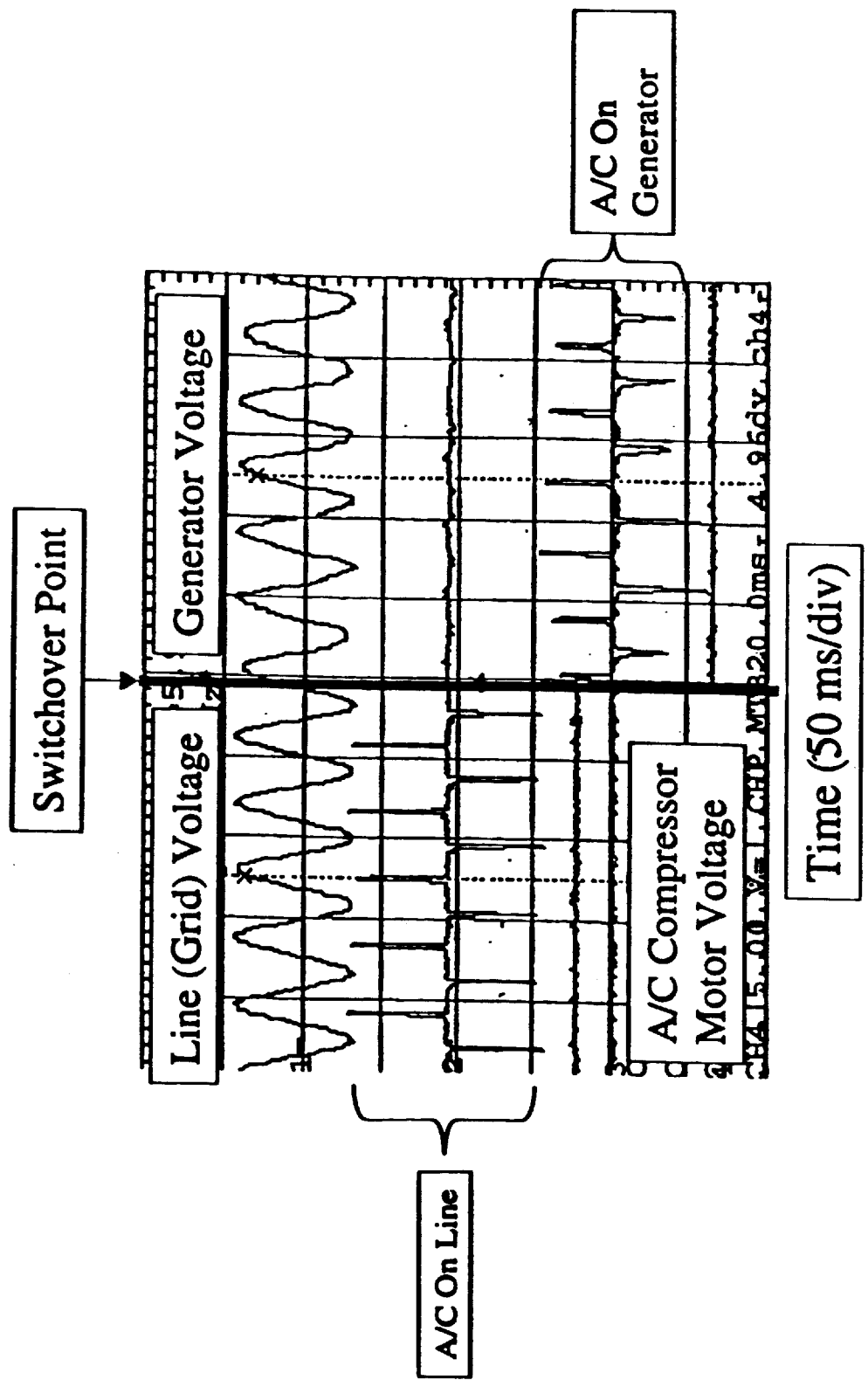

The switching mechanism 40 can use a variety of mechanical switches including devices such as electromagnetic relays and contacts, manual switches, vacuum and gas-filled electronic tubes, solid state devices, microcomputers and various combination thereof. Testing has shown that using just these circuits may not result in a reliable transfer of load 20 all of the time. Further enhancements to the invention were made to increase reliability. A small microcomputer was assembled with voltage detecting circuits, control relays, logic inputs, and a program incorporating the logic described above as an improvement on the basic concept of this invention. Since device 20 requires alternating current from the grid and generator for operation, it is essential that the current from the generator 22 be operating in the same direction and be in phase with the current on grid 12. A microcomputer model MCD11A8 was used to provide improvement to the invention, but it is to be understood that many other microcomputers and similar devices could alternatively be used. The MCD11A8 microcomputer in FIG. 5 has four logic inputs A0 through A3 and nine logic outputs B0 through B7 and C0. The logic outputs are buffered by IC4 and thus drive solid-state relays SS0 through SS8. These solid-state relays provide the same outputs as the electro-mechanical relays described as a part of FIGS. 4a through 4f.

The micro processor monitors the state of the A/C thermostat TS1 through input A2. It monitors the standby contacts, ATS on a standard automatic transfer switch through input A3. Depending on the sensed command from these inputs it takes one of two possible actions.

The micro processor senses the closure of contacts on TS1 through input port A2. This causes an engine start command to be issued by energizing micro relays K1, K2 and K3 through solid state switches and SS3, SS4 and SS5 through output ports B3, B4 and B5 through interface IC4. A command to flash the field of the generator is issued by solid state switch SS7 through output port B7 through interface IC4. The A/C on command is issued by energizing relay K4 through solid state switch SS8 through output port CO and interface IC4. The A/C is started on grid power through solid state relays N1 and N2 through solid state switch SS0 through output port B0 and interface IC4.

The micro processor monitors the inputs from line sensor T1 and generator sensor T2 through phase detectors A1 and A2, IC1, IC2 and IC3 to input ports A0 and A1. When A0 and A1 are both present at the same time, then command "A/C line off" is issued to solid state relays N1, N2 through solid state switch SS0 through output port B0 and interface IC4. The A/C generator "line on" command is issued to solid state relays G1, G2 through solid state switch SS1 through output port B1 and interface IC4.

The command to run the engine cooling fan is issued through IC4 and SS2 to the same relay EFAN as described above. IC4 also issues engine speed control commands via SS3, SS4, and SS5 to relays K1, K2, and K3. These three relays perform the same resistor shorting functions as relays SR, SR, and GRDY10 on FIG. 4f.

The microcomputer MCD11A8 is programmed to use the logic described above in FIGS. 4a to 4f to time the issuance of the commands discussed above. The only change to the logic is to allow N1 and N2 to be de-energized and G1 and G2 to be energized only after coincident input pulses are received from inputs A1 and A0. Phase detectors A1 and A2 are designed to issue a short pulse 1.5 milliseconds before the voltage they are reading passes up through zero. For 60 Hz power, this occurs 60 times each second as the voltage swings from a positive peak to a negative peak. The rationale for this is that reliably smooth transfers of load from grid to generator depend upon minimizing the current draw placed on the generator at the switch over. Testing showed that the current draw was minimized by insuring that the voltages from the grid and generator are nearly in phase before the switch over is initiated.

The micro processor monitors the state of the A/C thermostat TS1 and the standby contacts ATS on the standard automatic transfer switch. If the contacts on the automatic transfer switch remain open no action is taken. The microcomputer continues to look at the A/C thermostat input on A2. When the A/C is satisfied TS opens and an A/C stop command is issued through relay K4 through solid state switch SS8 through output port C0 and interface IC4. An A/C generator off command is issued through solid state relays G1, G2 through solid state switch SS1, output port B1 and interface IC4. The engine stop command is issued as a zero RPM speed command through relays K1, K2, and K3 from SS3, SS4, and SS5 and IC4. The micro computer recycles to monitor the A/C thermostat switch TS1 and the standby contacts of the automatic transfer switch.

When the micro computer senses the closure of the standby contacts ATS of the automatic transfer switch it waits for twenty five seconds and looks again for the closed contacts. If the contacts are still closed the micro computer issues the engine start command through solid state switches SS3, SS4 and SS5 through output port B3, B4 and B5 through interface IC4. The generator field flashing command is issued through solid state switch SS8 through output port B7 through interface IC4.

The micro processor continues to monitor the state of the contacts on the automatic transfer switch. When an open contact is sensed by ATS, the stop engine command is issued through solid state switches SS3, SS4 and SS5 through output port B3, B4 and B5 through interface IC4 as a zero RPM speed command.

The micro processor recycles to monitor the A/C thermostat switch TS1 and the ATS contact on the automatic transfer switch. Given that the microcomputer has a line sensor input at port A0, it is possible that the line sensor function of a conventional ATS can be eliminated and this function be provided by input A0. Programming changes are to be understood, but it is anticipated that this simplification of the overall invention provides the opportunity to produce a less costly system by using the line sensor A1 for two functions and replacing the conventional ATS similar to model 4W123, costing about $2400, with a simple electromechanical switch similar to model 1ZCOO, costing about $460 (manufacturer's costs and model numbers, other manufacturers offer similar products and prices).

As seen in FIGS. 2 and 3, one of the key features of the present invention is that the generator 22 can be used as a backup generator for key (critical) circuits 16 during times when the grid 12 is down and unable to provide power such as during severe storms and other disasters including inability of the grid power provider to deliver sufficient power for certain critical needs during brownout and blackout periods. In such a situation, the invention features the use of a second switch S-4 that allows for use of selected critical circuits such as critical circuit 16 to operate during such outages.

When used as a backup power device, the concept of sizing the generator to meet running loads rather than typically much larger start up loads can also be applied to operate multiple circuits 16 with a total starting load much larger than the total output capacity of generator 22. As will be seen, generator 22 can be sized to meet the total running load of circuits 16 rather than the total start up loads of these circuits. In this situation, circuits 16 are classified as having interruptible loads, intermittent loads, and non-interruptible loads. Referring to Table 1, it can be seen that refrigerators, freezers and furnaces have large startup loads and relatively small running loads, typically at least three times smaller. Further, these appliances can be turned off for brief periods of time without noticeable impact on the appliance itself or without being noticed by the occupant. A lighting or computer circuit on the other hand would not be considered interruptible since momentary loss of the circuit would not only be annoying but also possibly dangerous or result in monetary loss. Sump pumps and well pumps have what is termed an intermittent operation. That is, these items run for a few minutes followed by a long period in which they are in an off state.

To put a small-sized generator to optimal use in an emergency situation, it is possible to use the generator to power circuits with a total startup current draw that appreciably exceeds the output capacity of the generator. In a first instance, the switching device can be used to disrupt interruptible loads such as refrigerators and freezers when generator capacity is need to power the start up of other circuits such as well or sump pumps. As soon as the pump comes to operating capacity and the startup draw has been met, the interruptible loads can be again energized.

To further maximize the generator capacity, the intermittent loads such as the well and sump pumps and be allowed to complete their cycle and return to an off state prior to restarting the other circuits. Using intelligent load control, it is possible to run all of the devices shown in Table 1 with a generator with half of the total starting load. Taking the appliances in Table 1, it is seen that a generator of about more than 10 kW is required for possible simultaneous start up of all appliance. Using scheduling of the appliances can reduce the size of the generator by a factor of a third.

For example, maintaining the lighting circuit with the light and furnace in running mode while shutting down the refrigerator and freezer will allow sequential starting and running of the sump and well pumps with a 5 kW generator. If the sump and well pumps are allowed to complete their cycles and return to an off position, the furnace can be started without disruption of the refrigerator, freezer or lighting circuits.

As can be appreciated, to maintain the relatively small size of the electrical power generation device 30 as both a power shaving device, i.e, for the use of lost cost fuels for large draw appliances such as air conditioners during peak electrical load periods, and as a backup source for use when grid power is unavailable, a large load device that must be started from the grid is assumed to be of a non-essential character whose use can be discontinued during grid power outage. Although it is not essential that the load 20 be discontinued during such power outages, it is to be realized that many of the capital costs and operating efficiencies of the power generation device 30 are lost when the power using device (load) 20 must be operated during such periods. By discontinuing the use of a large load 20 such as an air conditioner, a number of smaller intermittent or interruptible loads 20 with substantial total startup load can be substituted in place of the air conditioner and operated using an undersized generator by advantageously scheduling the operation of the various loads so as to take advantage of the interruption of some circuits such as refrigeration or heating circuits while scheduling intermittent loads such as sump and well pumps in sequential fashion to avoid a large number of circuits 16 being placed in startup mode at the same time.

While it is possible that changes in configurations to other than those shown could be used but that which is shown is preferred and typical. Without departing from the spirit of this invention, various means of switching among the components together may be used including the use of conventional relays and contacts, solid state devices, and microcomputers and various combinations thereof. It is therefore understood that although the present invention has been specifically disclosed with the preferred embodiment and examples, modifications to the design concerning specific electronic components and switching logic will be apparent to those skilled in the art and such modifications and variations are considered to be equivalent to and within the scope of the disclosed invention and the appended claims.

We claim:

1. A power supply comprising:
   a. a conductor for connecting to an electrical power grid;
   b. an electrical power generation device that is of insufficient size for initial start-up of an electrical power using device; and
   c. a switching device that:
      1) isolates said electrical power grid from said electrical power generation device;
      2) connects said power grid conductor to said electrical power using device for initial start-up of said power using device; and then
      3) connects said power generation device to said power using device after initial start-up.

2. The power supply according to claim 1 wherein said electrical power using device uses at least about one and a half times more electrical power during start-up as during operation after start-up.

3. The power supply according to claim 1 wherein said power using device is an air conditioning unit.

4. The power supply according to claim 1 with said electrical power generation device comprising an electrical generator driven by a prime mover.

5. The power supply according to claim 4 wherein a carbon-based fuel is used as a source of energy for said prime mover.

6. The power supply according to claim 5 further comprising means for increasing an amount of said carbon-based fuel delivered to said prime mover prior to switching said electrical power using device from said power grid conductor to said power generation device.

7. The power supply according to claim 5 wherein said carbon-based fuel is natural gas.

8. The power supply according to claim 4 further comprising means for increasing output speed of said prime mover prior to switching said electrical power using device from said power grid conductor to said power generation device.

9. The power supply according to claim 1 wherein said electrical power generation device is sized to match only the running power demand of said power using device.

10. The power supply according to claim 1 further comprising at least one circuit connected only to said conductor.

11. The power supply according to claim 1 further comprising at least one circuit that is connected to said power grid by said switching mechanism when said power grid is on and to said power generation device when said power grid is off.

12. The power supply according to claim 1 wherein an output capacity of said power generation device is sized to match a running power demand of of said power using device.

13. The power supply according to claim 1 further comprising a first circuit that is connected to said power grid by said switching device when said power grid is on and to said power generation device when said power grid is off and wherein said power switching device disconnects said power using device from said power generation device when the power grid is off.

14. The power supply according to claim 13 further comprising:
   a) a second circuit connected to said power grid by said switching device when said power grid is on and to said power generation device when said power grid is off;
   b) said first circuit being an interruptible load circuit with a startup load condition and a running load condition;
   c) said second circuit being an intermittent load circuit with a startup load condition and a running load condition; and
   d) when said first and said second circuits are connected to said power generation device, said switching device turns said interruptible load circuit off prior to placing said intermittent load circuit in said startup load condition.

15. The power supply according to claim 14 wherein said power generation device is capable of maintaining simultaneously said running load conditions of said interruptible load circuit and said intermittent load circuit and is incapable of maintaining simultaneously the startup load conditions of said interruptible load circuit and said intermittent load circuit.

16. The power supply according to claim 14 further comprising at least one non-interruptible circuit connected to said power grid by said switching device when said power grid is on and to said power generation device when said power grid is off and when said non-interruptible circuit is connected to said power generation device, said switching device maintaining said non-interruptible circuit in an on state.

17. The power supply according to claim 13 further comprising:
   a) a second circuit connected to said power grid by said switching device when said power grid is on and to said power generation device when said power grid is off;
   b) said first circuit being an interruptible load circuit with a startup load condition and a running load condition;
   c) said second circuit being an intermittent load circuit with a startup load condition, a running load condition, and an intermittent period of operation; and
   d) when said first and said second circuits are connected to said power generation device, said switching device maintaining said intermittent load in a running load condition until completion of said intermittent period of operation.

18. The power supply according to claim 17 further comprising at least one non-interruptible circuit connected to said power grid by said switching device when said power grid is on and to said power generation device when said power grid is off and when said non-interruptible circuit is connected to said power generation device, said switching device maintaining said non-interruptible circuit in an on state.

19. The power supply according to claim 1 wherein said switching device keeps said power using device connected to said power generation device for a pre-determined time after the power grid is off.

20. The power supply according to claim 1 where in said switching device is a solid state device.

21. The power supply according to claim 1 where in said switching device is a micro computer.

22. The power supply according to claim 1 further comprising a voltage sensor for said power grid, a second voltage sensor for said power generation device, and a synchronization sensor for determining when a temporary coincidence of the pulses occurs at which time said switching device switches said electrical power using device from said power grid to said electrical power generation device.

23. The power supply according to claim 22 wherein said switching device switches the electrical power using device from said power grid to said electrical power generation device when the line voltage is zero.

24. A method of operating an electrical load with a start up load condition and a running load condition with an under-sized power generator incapable of providing start-up power to meet said start up load condition of said load but capable of delivering running load power to meet said running load condition of said load, said method comprising:
   a. starting said load from a power grid capable of meeting said start-up power load condition; and
   b. after starting and reaching said running load condition of said load with said power grid, switching said load to said under-sized generator.

25. The method according to claim 24 wherein said power grid is electrically isolated from said under-sized generator at all times.

26. The method according to claim 24 further comprising the steps of:
   a) sensing a voltage pulse of said power grid;
   b) sensing the voltage pulse of said under-sized generator;
   c) determining a temporary coincidence of said voltage pulse of said power grid and said voltage pulse under-sized generator;
   d) switching said load from said power grid to said under-sized generator during said temporary coincidence of said voltage pulse of said power grid and said voltage pulse under-sized generator.

27. The method according to claim 26 further comprising the step of timing said switching of said load from said power grid to said under-sized generator to occur at about zero voltage.

28. The method according to claim 24 wherein said under-sized generator is driven by a fossil-fuel engine and further comprising the step of providing additional fuel to said fossil-fuel engine prior to switching said load from said power grid to said generator.

29. The method according to claim 24 further comprising the step of increasing rotational speed of said generator prior to switching said load from said power grid to said generator.

30. An assembly for starting and operating a predetermined load with a start-up load condition and a lesser running load condition comprising:
   a. an undersized generator capable of running but not starting said load; and
   b. a switching device comprising means for:
      1) connecting said load to a power source capable of starting and running said load; and
      2) switching said load after starting and running from said power source to said undersized generator capable of only running said load.

31. The assembly according to claim 30 with said switching device comprising means for connecting said generator to multiple load circuits with a total start-up load greater than the total output of said generator and a total running load matched to said generator; said switching device switching off selected load circuits during start up of other load circuits so as not to exceed the total output of said generator.

32. The assembly according to claim 31 with said switching device comprising means for connecting said generator to multiple load circuits with a total start-up load greater than the total output of said generator and a total running load matched to said generator; said switching device allowing load circuits to complete a running cycle and return to an off state prior to during start up of other load circuits so as not to exceed the total output of said generator.

* * * * *